E. J. SELLEY.
VEHICLE WHEEL.
APPLICATION FILED MAR. 16, 1908.

942,939.

Patented Dec. 14, 1909.

Witnesses:
Ralph Lancaster.
Frank L. Stubbs.

Inventor
Edwin J. Selley,
By his Attorney
W. P. Hutchinson.

UNITED STATES PATENT OFFICE.

EDWIN JAMES SELLEY, OF NEW YORK, N. Y.

VEHICLE-WHEEL.

942,939.  Specification of Letters Patent.  Patented Dec. 14, 1909.

Application filed March 16, 1908. Serial No. 421,382.

*To all whom it may concern:*

Be it known that I, EDWIN JAMES SELLEY, of the city, county, and State of New York, have invented a new and useful Improvement in Vehicle-Wheels, of which the following is a full, clear, and exact description.

My invention relates to improvements in vehicle wheels, and the object of my invention is to produce a strong yet resilient wheel in which there shall be a spring connection between the outer and inner parts of the wheel, which spring connection is yielding but strong, and is sufficiently resilient to obviate the necessity of using other springs to connect the vehicle body with its axle.

My invention is intended also to produce a wheel in which the parts are easily assembled, and which in case of an accident, is constructed so that the parts can be easily duplicated and readjusted if necessary.

My invention is also intended to produce a wheel in which a simple means is provided for regulating the tension of the springs which constitute a part of the resilient members of the wheel.

Reference is to be had to the accompanying drawings forming a part of this specification, in which similar reference characters indicate corresponding parts in all the views.

Figure 1:
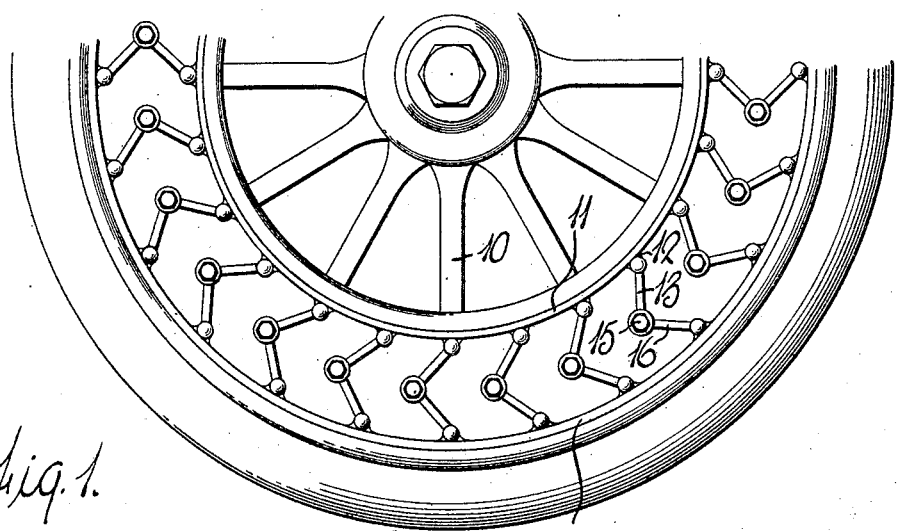
Figures 2, 3, 4:
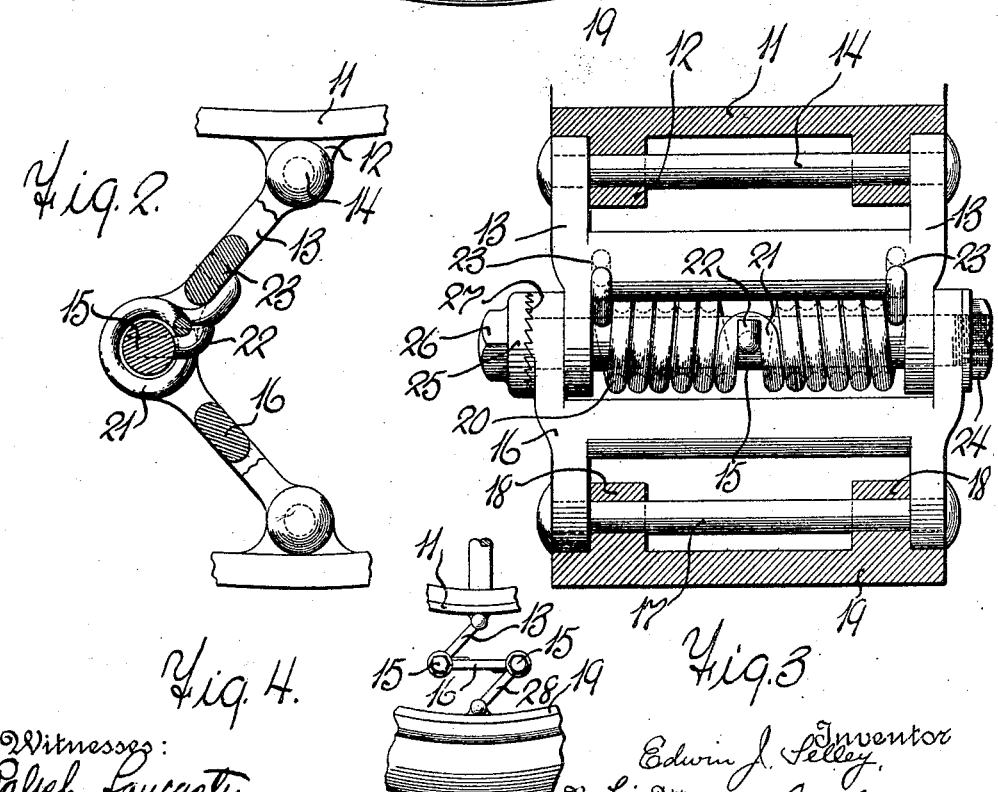

Figure 1 is a broken side elevation of the wheel embodying my invention. Fig. 2 is an enlarged detail section showing the connecting links between the outer and inner fellies or rims. Fig. 3 is an enlarged detail cross section showing the aforesaid connection between the two fellies, and Fig. 4 is a broken detail side elevation of a slight modification of the invention.

The wheel is provided with an inner portion 10, having the usual hub and axle, and which is practically a small wheel of any customary or approved construction. This part of the structure forms no part of my invention. The inner wheel or member 10 has an inner felly 11 preferably of metal, in which are a series of bosses 12 arranged in pairs as shown in Fig. 3 and spaced regularly apart, these bosses connecting with the inner forked ends of the links 13, which links have their outer ends, also forked, connected by bolts 15 with the outer links 16 which are substantially like the links 13 already referred to, and which connect by bolts 17 with lugs 18 on the outer felly 19.

The outer felly is also preferably of metal, and has the usual or any preferred arrangement of tire and shoe. The links 13 and 16 act like toggle levers, the fulcrum of which is the bolt 15, and coiled around each bolt 15 is a helical spring 20 which in the center is doubled upon itself as shown at 21 and engaged with a hook 22 extending into the bolt 15 near the center. The ends of the spring after being coiled around the bolt as shown, connect as shown at 23 with holes in the link 13, although obviously the connection might be with the other link 16, if desired. The tension of the spring 20 is such as to normally straighten up the toggle levers 13 and 16, and while I have shown a very convenient and preferable means of fastening the spring to the parts aforesaid, it is obvious that it is not really essential, and that the spring may be coiled around the bolt 15 in any convenient way, so long as it is arranged to have its tension directed in a manner to straighten out the toggles.

To provide for adjusting the spring so as to regulate its tension, the bolt 15 is provided at one end with a nut 24 and at the other end with a head having ratchet serrations or teeth 25 therein, and having a squared portion 26 to receive a wrench. The teeth 25 register with corresponding teeth 27 on the link 26. Thus by loosening up the nut 24 and then turning the squared part 26 of the bolt head, the ratchet teeth can be slipped past one another, and the tension of the spring increased, or by loosening the nut 24 still more, the teeth may be placed out of engagement and the spring tension lessened. It will be seen that in any event I have provided a very resilient and adjustable spring connection between the outer and inner fellies.

If desired I can use more than two levers or links 13 and 16 to connect the fellies 11 and 19, and in Fig. 4 I have shown an extra link 28 and an extra bolt 15 for the connected parts, so that another spring is provided and even greater resiliency can be had. Ordinarily the two links and levers are sufficient, however.

Having thus fully described my invention, I claim as new and desire to secure by Letters Patent:—

1. A vehicle wheel having an inner and outer felly, links pivoted to the inner felly and links pivoted to the outer felly, bolts for pivotally connecting the links together in pairs, hooks extending into the bolts, and springs having loops in their centers adapted to engage the hooks, said springs being coiled around the bolts and having their ends anchored to the links and adapted to move the said links on the bolts.

2. A vehicle wheel having an inner and outer felly, links pivoted to the inner felly and links pivoted to the outer felly, bolts for pivotally connecting the links together in pairs, hooks extending into the bolts, springs having loops in their centers adapted to engage the hooks, said springs being coiled around the bolts and having their ends anchored to the links and adapted to move the said links on the bolts, and a ratchet connection between the bolt and one of the links.

3. A vehicle wheel having inner and outer fellies, links arranged in pairs and pivotally connecting the two fellies, each pair of links being pivoted together, a spring coiled around the connecting pivot of each pair of links and arranged to normally straighten the links, ratchet teeth on one end of one link of each pair, and a ratchet on the bolt for engaging the teeth of the link.

EDWIN JAMES SELLEY.

Witnesses:
 GEO. F. KRONER, Jr.,
 FRANK FRERICHS.